J. P. Woods,
Barrel Head Gage.
Nº 27,955.   Patented Apr. 17, 1860.
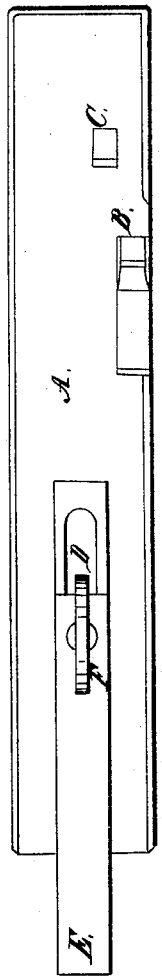
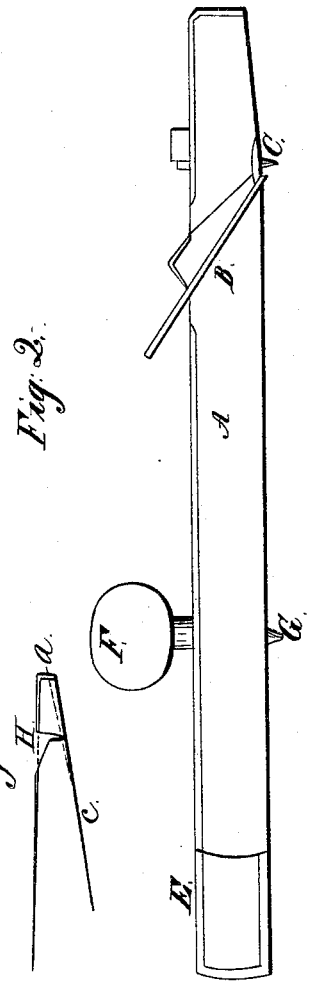
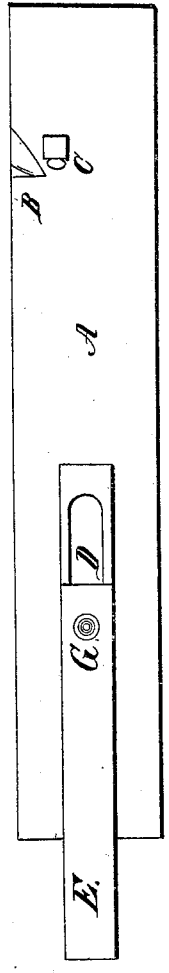
Witnesses:
J. Brainerd
W. H. Burridge
Inventor:
Jos. P. Woods

UNITED STATES PATENT OFFICE.

J. P. WOODS, OF TROY, OHIO, ASSIGNOR TO HIMSELF, AND A. JOHNSON, OF PARKMAN, OHIO.

COOPER'S TOOL.

Specification of Letters Patent No. 27,955, dated April 17, 1860.

*To all whom it may concern:*

Be it known that I, JOSEPH P. WOODS, of Troy, in the county of Geauga and State of Ohio, have invented new and useful Improvements in an Instrument for Cutting the Heads of Barrels, which I Denominate a "Barrel-Head Parer;" and I do hereby declare that the following is a full and complete description of the construction and operation of the same, reference being had to the accompanying drawings, making part of this specification, in which—

Figure 1 is a top view, Fig. 2 is a side view and Fig. 3 is a view of the underside.

Like letters refer to like parts.

The nature of my invention relates to the formation of a tool by means of which, the circumference of a barrel head, may be cut and beveled to the proper size and thickness for the chime, so that by shaving away the superfluous wood upon the under side, the head will be completed, and ready to set.

A represents the stock of the tool. This is made of hard wood, something in the form of a plane stock. The length should be about one foot, the width about three inches, and the thickness about two inches.

Near the end, as seen at B, is a cutting bit, in form and position, much like that of a rabbet plane. This bit is let into the side of the stock as seen in Fig. 2, the outer corner of the bit projecting a little below the underside of the stock A. Immediately in front of this bit, is a cutting tooth or spur C, much like that of a splitting gage. This, like the bit B, is held by a key or wedge, as is common in such cases.

The tooth or spur, C, projects about the eighth or tenth of an inch farther from the stock than the bit B, for the purpose of cutting the thickness of the head, as seen in Fig. 4, so that a little matter shaved off from the lower side of the head, as indicated by the dotted line $a$, $c$, will fit it for setting. For the purpose of causing the tool to sweep a circle that will fit various sized barrels, I mortise the stock A, as seen at D, and into this mortise, I insert a slider E, which is secured at any desired place, by means of a thumb screw F, which passes through both legs of the slider E, the lower one forming the nut, thus gripping both legs closely upon the wood of the stock A.

The screw terminates in a point G Figs. 2 and 3, which forms a center pin or point around which the bit B and spur C sweeps. By loosening this thumb screw, and setting the slider nearer to, or farther from the tooth C, a circle of any diameter can be described.

In using this tool, the point of the thumb screw is depressed into the center of the barrel head, (which must rest upon points to prevent it from turning) and held steady with the left hand. The bit end of the tool is seized with the right hand, and swept around, and the tool will cut a circular groove like that seen at H in Fig. 4. Now by shaving off the superfluous wood to the line $a$, $c$, the head will be completed, ready for setting.

What I claim as my improvement and desire to secure by Letters Patent, is—

The herein described barrel head parer, consisting of the stock A, bit B, tooth C, slider E, and thumb screw F, when these several parts, or their equivalents are constructed and arranged as specified, and operating in the manner and for the purpose set forth.

JOS. P. WOODS.

Witnesses:
G. B. HOUGHTON,
N. E. SCOTT.